US 8,350,666 B2

(12) United States Patent
Kore

(10) Patent No.: US 8,350,666 B2
(45) Date of Patent: Jan. 8, 2013

(54) APPARATUS AND METHOD FOR LOCATION-BASED ACCESS CONTROL IN WIRELESS NETWORKS

(75) Inventor: Vinayak S. Kore, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 591 days.

(21) Appl. No.: 12/577,675

(22) Filed: Oct. 12, 2009

(65) Prior Publication Data
US 2010/0164720 A1 Jul. 1, 2010

Related U.S. Application Data

(60) Provisional application No. 61/105,716, filed on Oct. 15, 2008.

(51) Int. Cl.
G05B 19/00 (2006.01)
(52) U.S. Cl. .......................... 340/5.2; 455/411
(58) Field of Classification Search .................. 340/5.2, 340/10.1, 10.5; 455/410, 411, 421; 370/310; 342/450; 709/225
See application file for complete search history.

(56) References Cited

U.S. PATENT DOCUMENTS

| 5,051,741 | A | 9/1991 | Wesby |
| 6,021,330 | A | 2/2000 | Vannucci |
| 6,034,603 | A | 3/2000 | Steeves |
| 6,255,988 | B1 | 7/2001 | Bischoff |
| 6,473,038 | B2 * | 10/2002 | Patwari et al. ................ 342/450 |
| 6,570,487 | B1 | 5/2003 | Steeves |
| 6,850,502 | B1 * | 2/2005 | Kagan et al. .................. 370/330 |
| 6,961,541 | B2 * | 11/2005 | Overy et al. .................. 455/410 |
| 7,005,985 | B1 | 2/2006 | Steeves |
| 7,027,416 | B1 | 4/2006 | Kriz |
| 7,152,791 | B2 | 12/2006 | Chappidi et al. |
| 7,286,158 | B1 | 10/2007 | Griebenow |
| 7,289,466 | B2 | 10/2007 | Kore et al. |
| 7,379,729 | B2 | 5/2008 | Holland et al. |
| 7,518,499 | B2 | 4/2009 | Werenka |
| 7,603,129 | B2 | 10/2009 | Gonia et al. |
| 7,640,007 | B2 * | 12/2009 | Chen et al. ................... 340/10.1 |
| 7,853,250 | B2 * | 12/2010 | Harvey et al. ................. 455/421 |
| 2004/0029558 | A1 | 2/2004 | Liu |
| 2005/0128074 | A1 | 6/2005 | Culpepper et al. |
| 2005/0201349 | A1 | 9/2005 | Budampati |
| 2005/0281215 | A1 | 12/2005 | Budampati et al. |
| 2006/0002368 | A1 | 1/2006 | Budampati et al. |

(Continued)

OTHER PUBLICATIONS

"IntelaTrac PKS Redefines Field Data Collection and Management," Honeywell, Feb. 2006, 2 pages.

(Continued)

Primary Examiner — Thomas Mullen

(57) ABSTRACT

A method includes receiving wireless signals from a device at a wireless access point associated with a wireless network. The method also includes estimating a location of the device and determining whether the estimated location is within a specified area. In addition, the method includes allowing the device to communicate over the wireless network in response to determining that the estimated location is within the specified area. Estimating the device's location could include estimating a direction of the device with respect to the wireless access point and/or estimating a distance of the device from the wireless access point. Estimating the direction of the device could include using a direction of arrival of at least one wireless message received at the wireless access point from the device. Estimating the distance of the device could include transmitting multiple messages to the device at different power levels and receiving one or more responses from the device.

20 Claims, 4 Drawing Sheets

U.S. PATENT DOCUMENTS

| | | | |
|---|---|---|---|
| 2006/0063523 A1* | 3/2006 | McFarland | 455/423 |
| 2006/0143292 A1* | 6/2006 | Taubenheim et al. | 709/225 |
| 2006/0171344 A1 | 8/2006 | Subramanian et al. | |
| 2006/0171346 A1 | 8/2006 | Kolavennu et al. | |
| 2006/0176169 A1 | 8/2006 | Doolin et al. | |
| 2006/0205417 A1 | 9/2006 | Ju et al. | |
| 2006/0227729 A1 | 10/2006 | Budampati et al. | |
| 2006/0261940 A1 | 11/2006 | Defant et al. | |
| 2006/0274644 A1 | 12/2006 | Budampati et al. | |
| 2006/0274671 A1 | 12/2006 | Budampati et al. | |
| 2006/0287001 A1 | 12/2006 | Budampati et al. | |
| 2007/0030816 A1 | 2/2007 | Kolavennu | |
| 2007/0030832 A1 | 2/2007 | Gonia et al. | |
| 2007/0037588 A1 | 2/2007 | Mohi et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0132576 A1 | 6/2007 | Kolavennu et al. | |
| 2007/0132577 A1 | 6/2007 | Kolavennu | |
| 2007/0132637 A1 | 6/2007 | Kolavennu et al. | |
| 2007/0155401 A1 | 7/2007 | Ward et al. | |
| 2007/0155423 A1 | 7/2007 | Carmody et al. | |
| 2007/0205886 A1 | 9/2007 | Huseth et al. | |
| 2007/0241901 A1 | 10/2007 | Cage et al. | |
| 2007/0241965 A1 | 10/2007 | Kolavennu et al. | |
| 2007/0268884 A1 | 11/2007 | Kolavennu et al. | |
| 2008/0076450 A1 | 3/2008 | Nanda et al. | |
| 2008/0109098 A1 | 5/2008 | Moshier et al. | |
| 2008/0109099 A1 | 5/2008 | Moshier | |
| 2008/0122641 A1 | 5/2008 | Amidi | |
| 2008/0123934 A1 | 5/2008 | Amidi | |
| 2008/0209521 A1* | 8/2008 | Malaney | 726/4 |
| 2008/0267259 A1 | 10/2008 | Budampati et al. | |
| 2008/0273547 A1 | 11/2008 | Phinney | |
| 2009/0009327 A1 | 1/2009 | Amidi | |
| 2009/0010484 A1 | 1/2009 | Amidi | |
| 2009/0021390 A1 | 1/2009 | Amidi | |
| 2009/0115604 A1 | 5/2009 | Thomas et al. | |
| 2009/0176507 A1 | 7/2009 | Wu et al. | |
| 2009/0195384 A1 | 8/2009 | Amidi | |

OTHER PUBLICATIONS

Honeywell Process Solutions, "IntelaTrac PKS," Honeywell, 2 pages.
"Powerful Calibration Management with DocuMint," Honeywell, Mar. 2008, 4 pages.
"Lumidor Minimax XT," Honeywell, Dec. 2005, 4 pages.
"PanOS Platform, Unified Location Management Platform," PanGo, 2007, 2 pages.
"Ekahau T301-A Wi-Fi Tag," ekahau, 2007, 2 pages.
"Improve Maintenance Efforts with DocuMint," Honeywell, Feb. 2006, 3 pages.
Honeywell Process Solutions, "Mobile Station," Honeywell, 3 pages.
"WiMAX", http://en.wikipedia.org/wiki/Wimax, Aug. 20, 2008, 17 pages.
Dongyan Chen et al., "Dependability Enhancement for IEEE 802.11 Wireless LAN with Redundancy Techniques," Proceedings of the 2003 International Conference on Dependable Systems and Networks, 2003, 8 pages.
Dr. Soumitri Kolavennu, Presentation, "WNSIA MAC Layer", ISA SP100 meeting, Feb. 14, 2007, 24 pages, see esp. p. 17.
Soroush Amidi, "Method and Apparatus for Location Detection Using GPS and WIFI/WIMAX", U.S. Appl. No. 12/183,876, filed Jul. 31, 2008.
Soroush Amidi, "Method and Apparatus for Intermittent Location Reporting", U.S. Appl. No. 12/183,964, filed Jul. 31, 2008.
Jeffrey M. Becker, "System and Method for Providing Self-Locating Wireless Sensors", U.S. Appl. No. 12/183,263, filed Jul. 31, 2008.
Ramakrishna S. Budampati, et al., "Apparatus and Method for Deterministic Latency-Controlled Communications in Process Control Systems", U.S. Appl. No. 12/176,625, filed Jul. 21, 2008.
Goran M. Djuknic, et al., "Geolocation and Assisted-GPS", White-Paper, Mobility: 3G-CDMA2000 & UMTS, Lucent Technologies, Bell Labs, May 31, 2002, 10 pages.

* cited by examiner

APPARATUS AND METHOD FOR LOCATION-BASED ACCESS CONTROL IN WIRELESS NETWORKS

CROSS-REFERENCE TO RELATED APPLICATIONS

This application claims priority under 35 U.S.C. §119(e) to U.S. Provisional Application No. 61/105,716 filed on Oct. 15, 2008, which is hereby incorporated by reference.

TECHNICAL FIELD

This disclosure relates generally to wireless systems. More specifically, this disclosure relates to an apparatus and method for location-based access control in wireless networks.

BACKGROUND

Security is typically an important aspect of wireless networks. Various security mechanisms, such as encryption and digital signatures, are often used in wireless networks to reduce or prevent unauthorized intrusions into the wireless networks. "Wired-equivalent" security is often the desired level of security in wireless networks. In other words, the level of security in wireless networks would ideally equal or match the level of security in wired networks.

Security in wired networks is simplified by the fact that access to a wired network typically requires physical access to the wired network. As a result, unless an intruder gains physical access to a premises, the wired network is typically secure. However, wireless networks are susceptible to attacks even from outside of a secured premises. Wireless networks therefore typically use complex security protocols, such as those based on encryption and authentication, to safeguard communications and access to the wireless networks. Unfortunately, encryption, authentication, and other standard security mechanisms are often computationally intensive. This often makes these security mechanisms unsuitable for use in wireless sensor networks or other wireless networks having nodes with less or limited resources.

SUMMARY

This disclosure provides an apparatus and method for location-based access control in wireless networks.

In a first embodiment, a method includes receiving wireless signals from a device at a wireless access point associated with a wireless network. The method also includes estimating a location of the device and determining whether the estimated location is within a specified area. In addition, the method includes allowing the device to communicate over the wireless network in response to determining that the estimated location is within the specified area.

In a second embodiment, an apparatus includes a wireless interface configured to receive wireless signals from a device attempting to communicate over a wireless network. The apparatus also includes a controller configured to estimate a location of the device and to allow the device to join the wireless network based on a determination that the estimated location of the device is within a specified area.

In a third embodiment, a computer readable medium embodies a computer program. The computer program includes computer readable program code for estimating, at a wireless access point associated with a wireless network, a location of a device attempting to access the wireless network. The computer program also includes computer readable program code for determining whether the estimated location of the device is within a specified area. In addition, the computer program includes computer readable program code for allowing the device to communicate over the wireless network in response to determining that the estimated location of the device is within the specified area.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
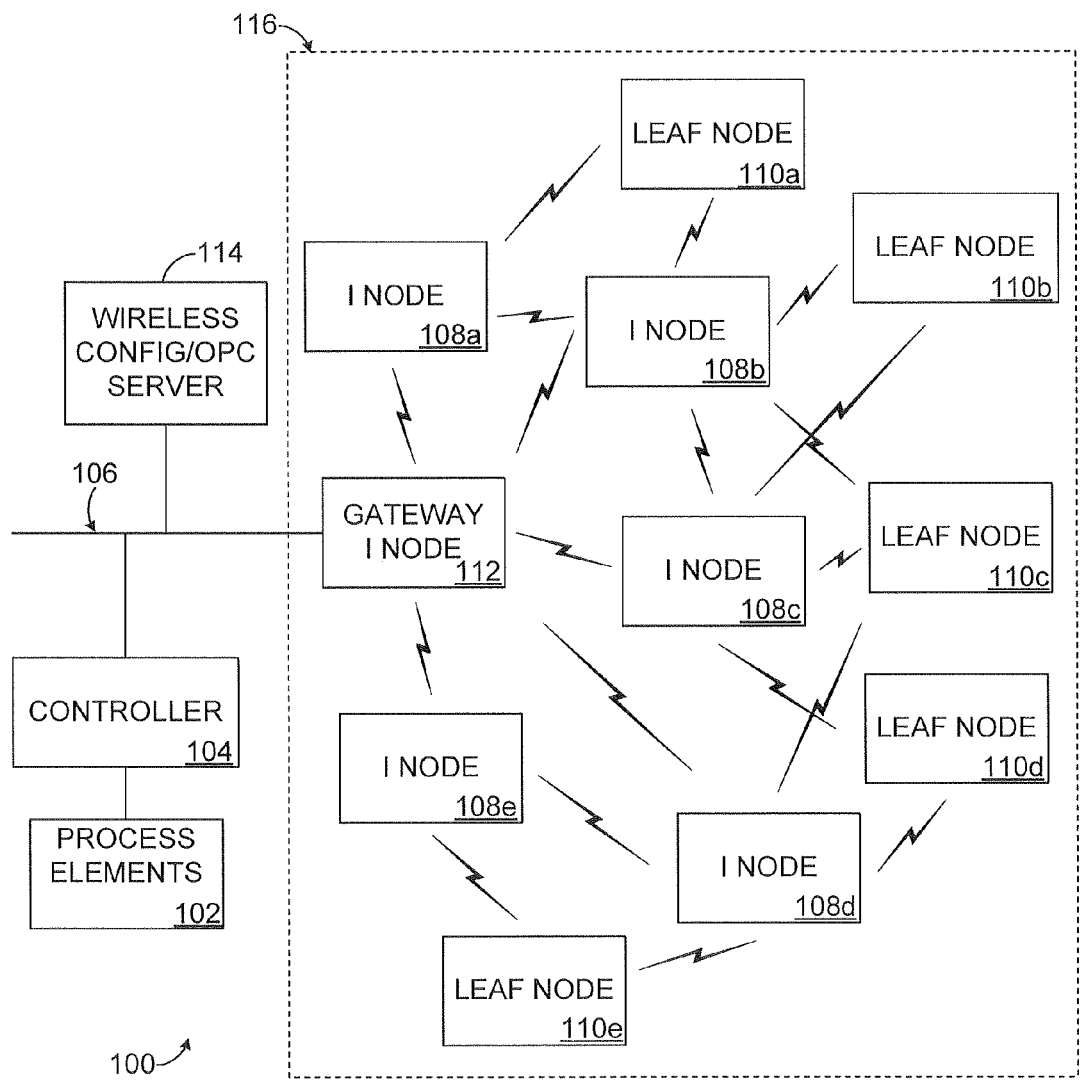
FIG. 1 illustrates an example system having a wireless network supporting location-based access control according to this disclosure.

FIG. 1 illustrates an example system 100 having a wireless network supporting location-based access control according to this disclosure. The embodiment of the system 100 shown in FIG. 1 is for illustration only. Other embodiments of the system 100 could be used without departing from the scope of this disclosure.

In this example embodiment, the system 100 represents a process control system designed to control one or more industrial processes. In this embodiment, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the process control system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the node 112) and wirelessly communicate the data to the leaf nodes 110a-110e. Similarly, the leaf nodes 110a-110e may wirelessly communicate data to the infrastructure nodes 108a-108e for forwarding to the network 106 (via the node 112). In addition, the infrastructure nodes 108a-108e may wirelessly exchange data with one another. In this way, the infrastructure nodes form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent routing devices that can store and forward messages for other devices. Infrastructure nodes 108a-108e are typically line-powered devices, meaning these nodes receive operating power from an external source. Infrastructure nodes 108a-108e are typically not limited in their operations since they need not minimize power consumption to increase the operational life of their internal power supplies. On the other hand, the leaf nodes 110a-110e are generally non-routing devices that do not store and forward messages for other devices (although they could). Leaf nodes 110a-110e typically represent devices powered by local power supplies, such as nodes that receive operating power from internal batteries or other internal power supplies. Leaf nodes 110a-110e are often more limited in their operations in order to help preserve the operational life of their internal power supplies.

The nodes 108a-108e and 110a-110e include any suitable structures facilitating wireless communications, such as radio frequency (RF) transceivers. The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the node 112. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices.

The gateway infrastructure node 112 communicates wirelessly with, transmits data to, and receives data from one or more infrastructure nodes and possibly one or more leaf nodes. The node 112 may also convert data between protocol (s) used by the network 106 and protocol(s) used by the nodes 108a-108e and 110a-110e. For example, the node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The node 112 could also convert data received from one or more of the nodes 108a-108e and 110a-110e into Ethernet-formatted data for transmission over the network 106. In addition, the node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

A wireless configuration and Object Linking and Embedding (OLE) for Process Control (OPC) server 114 can configure and control various aspects of the process control system 100. For example, the server 114 could configure the operation of the nodes 108a-108e and 112. The server 114 could also support security in the process control system 100, such as by distributing cryptographic keys or other security data to various components in the process control system 100 (like the nodes 108a-108e, 110a-110e, and 112). The server 114 includes any hardware, software, firmware, or combination thereof for configuring wireless networks and providing security information.

In one aspect of operation, the various wireless nodes are located within at least one specified area 116, such as a secure premises within an industrial facility. Various nodes (such as the gateway infrastructure and infrastructure nodes) can perform actions to verify that other nodes (such as leaf nodes) are within the specified area 116. If it can be determined that a node is within the specified area 116, that node can be allowed to access a wireless network.

In this way, the wireless network implements location-based access control. Nodes within the specified area 116 (such as within an industrial facility's premises) can gain access to the wireless network. Nodes outside of the specified area 116 are prevented from gaining access to the wireless network. Because of this, nodes are allowed to access a wireless network without needing to perform certain encryption, authentication, or other functions. This reduces the processing load placed on those wireless nodes, allowing resource-constrained wireless nodes (such as leaf nodes) to access the wireless network more easily. As a result, if access to the specified area 116 is controlled (such as by using human or video surveillance), access to the wireless network could be achieved in a manner that is near or equal to wired-equivalent security.

The location of a node can be determined using any suitable technique. In particular embodiments, any location determination technique could be used, as long as a node being located does not need to have any additional resources and a node performing the locating does not need to spend excessive time or power on access control related (non-payload) communications. One example technique for using location-based access control is described below.

Although FIG. 1 illustrates one example of a system 100 having a wireless network supporting location-based access control, various changes may be made to FIG. 1. For example, the system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where location-based access control could be used. This functionality could be used with any suitable device or system, whether or not that system or device is related to process control.

Figure 2:
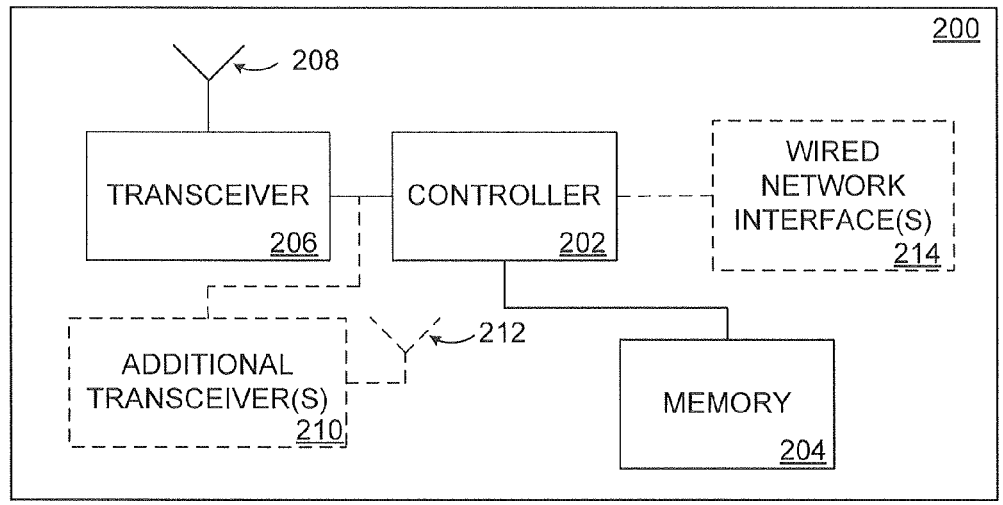
FIG. 2 illustrates an example wireless node in a wireless network according to this disclosure.

FIG. 2 illustrates an example wireless node 200 in a wireless network according to this disclosure. The wireless node 200 could, for example, represent a leaf node, infrastructure node, or gateway infrastructure node in the system 100 of FIG. 1 or other system. The embodiment of the wireless node 200 shown in FIG. 2 is for illustration only. Other embodiments of the wireless node 200 could be used without departing from the scope of this disclosure.

As shown in FIG. 2, the node 200 includes a controller 202. The controller 202 controls the overall operation of the node 200. For example, the controller 202 may receive or generate data to be transmitted externally, and the controller 202 could provide the data to one or more other components in the node 200 for transmission over a wired or wireless network. The controller 202 could also receive data over a wired or wireless network and use or pass on the data.

As particular examples, the controller 202 in a sensor leaf node could provide sensor data for transmission, and the controller 202 in an actuator leaf node could receive and implement control signals (note that a leaf node could represent a combined sensor-actuator device). As another example, the controller 202 in an infrastructure node could receive data transmitted wirelessly, determine a next hop for the data (if any), and provide the data for transmission to the next hop (if any). As a third example, the controller 202 in a gateway infrastructure node 112 could receive data from a wired network and provide the data for wireless transmission (or vice versa). The controller 202 could perform any other or additional functions to support the operation of the node 200, such as the determination of a location of a leaf node or other node (which is used for location-based access control).

The controller 202 includes any suitable hardware, software, firmware, or combination thereof for controlling the operation of the node 200. As particular examples, the controller 202 could represent a processor, microprocessor, microcontroller, field programmable gate array (FPGA), or other processing or control device.

A memory 204 is coupled to the controller 202. The memory 204 stores any of a wide variety of information used, collected, or generated by the node 200. For example, the memory 204 could store information received over one network that is to be transmitted over the same or different network. The memory 204 could also store data used during location-based access control, such as data defining a secured area or data associated with locations of one or more nodes. The memory 204 includes any suitable volatile and/or non-volatile storage and retrieval device or devices.

The node 200 also includes a wireless transceiver 206 coupled to an antenna 208. The transceiver 206 and antenna 208 can be used by the node 200 to communicate wirelessly with other devices. For example, in a leaf node, the transceiver 206 and antenna 208 can be used to communicate with infrastructure nodes. In an infrastructure node or gateway infrastructure node, the transceiver 206 and antenna 208 can be used to communicate with leaf nodes. One or more additional transceivers 210 could also be used in the node 200. For instance, in an infrastructure node or gateway infrastructure node, the additional transceiver(s) 210 could be used to communicate with WiFi or other devices (such as wireless controllers or hand-held user devices) and with other infrastructure nodes or gateway infrastructure nodes. The additional transceivers 210 may be coupled to their own antennas 212 or share one or more common antennas (such as antenna 208).

Each transceiver includes any suitable structure for generating signals to be transmitted wirelessly and/or receiving signals received wirelessly. In some embodiments, each transceiver represents an RF transceiver, although each transceiver could include a transmitter and a separate receiver. Also, each antenna could represent an RF antenna (although any other suitable wireless signals could be used to communicate). Note that one or more antennas could support beam-shaping, directional transmissions/receptions, or other features.

If the node 200 represents a gateway infrastructure node, the node 200 may further include one or more wired network interfaces 214. The wired network interfaces 214 allow the node 200 to communicate over one or more wired networks, such as the network 106. Each wired network interface 214 includes any suitable structure for transmitting and/or receiving signals over a wired network, such as an Ethernet interface.

In some embodiments, the node 200 may represent an infrastructure node (gateway or other) in the system 100. In these embodiments, the controller 202 could perform various functions to identify the location of a node (such as a leaf node) attempting to join a wireless network. Based on the determined location, the controller 202 can determine whether to allow the node to join the wireless network. Additional details regarding one specific implementation of a location-based access control technique are provided below.

Although FIG. 2 illustrates one example of a wireless node 200 in a wireless network, various changes may be made to FIG. 2. For example, various components in FIG. 2 could be combined, subdivided, or omitted and additional components could be added according to particular needs. Also, in general, a "wireless node" may represent any device that can transmit and/or receive data wirelessly (even if the "wireless node" has the ability to transmit and/or receive data over a wired connection, as well).

Figure 3:
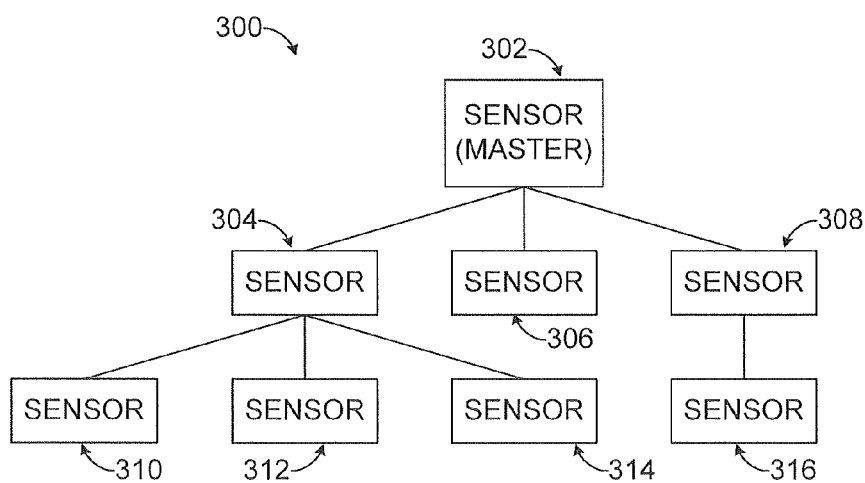
FIGS. 3 through 5 illustrate example wireless clusters and related operations supporting location-based access control according to this disclosure.
Figure 4:
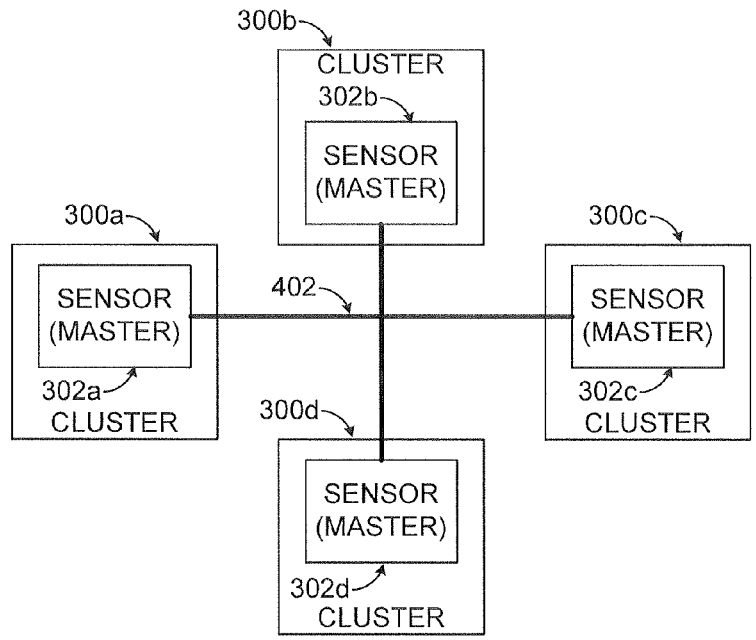
Figure 5:
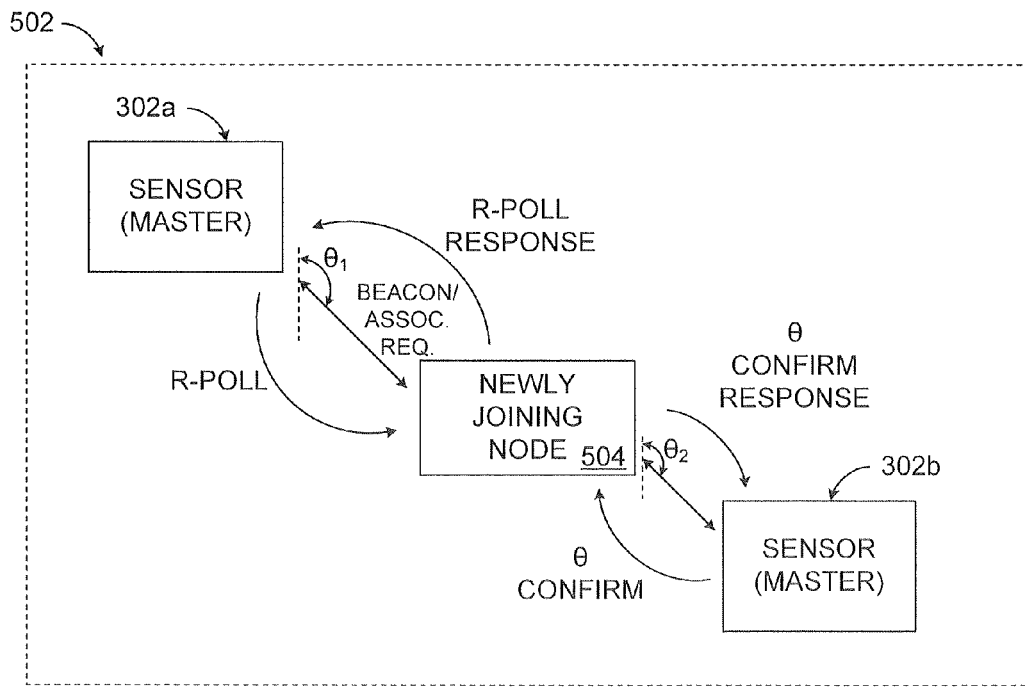

FIGS. 3 through 5 illustrate example wireless clusters and related operations supporting location-based access control according to this disclosure. The wireless clusters may be useful, for example, in wireless sensor networks or other process control systems (although non-sensor networks could also be used). The embodiments of the wireless clusters and their related operations shown in FIGS. 3 through 5 are for illustration only. Other embodiments of the wireless clusters and their operations could be used without departing from the scope of this disclosure.

In some embodiments, a sensor network can be formed entirely or substantially of one or more cluster tree networks. An example of a cluster tree network 300 is shown in FIG. 3. This topology can offer more coverage volume with limited communication range of the individual sensor nodes. As shown in FIG. 3, the cluster tree network 300 includes multiple sensors 302-316 arranged to communicate in a hierarchical manner. The sensor 302 represents the local "master," meaning the master is at the top of the cluster tree network 300. The other sensors 304-316 communicate as shown in FIG. 3. In this hierarchy, the sensors 304-308 can transmit data directly to the sensor 302, and the sensors 310-316 can transmit data indirectly to the sensor 302 via the sensors 304 and 308.

An example wireless sensor network 400 is shown in FIG. 4. The wireless sensor network 400 can include one or multiple sensor clusters. In FIG. 4, the sensor network 400 includes four sensor clusters 300a-300d. Each sensor cluster 300a-300d includes a local sensor master 302a-302d. A backbone network 402 connects the local sensor masters 302a-302d. The local sensor masters 302a-302d can have any suitable configuration, such as a star or multi-hop network, depending on the expected information flow in the sensor network 400.

In this example, the local sensor masters 302a-302d can act as access points for other nodes to join the wireless sensor network 400. The local sensor masters 302a-302d may have more resources than other sensors in the clusters 300a-300d since the local sensor masters 302a-302d provide routing and network management services to the sensor clusters 300a-300d. The local sensor masters 302a-302d are typically line-powered and have more processing and storage capabilities and longer communication ranges compared to other nodes.

FIG. 5 illustrates examples of communications that can be used to support location-based access control. In this example, two of the local sensor masters 302a-302b help to determine whether a newly joining node 504 resides within a specified area 502. If either of the local sensor masters 302a-302b detects the newly joining node 504 attempting to join a wireless network, the local sensor masters 302a-302b can perform various functions to support localization of the newly joining node 504. The functions supporting localization can be implemented in hardware, software, firmware, or any combination thereof.

Assume the local sensor master 302a detects the newly joining node 504. The local sensor master 302a could determine an angle of reception and transmission associated with the newly joining node 504. For example, the local sensor master 302a can determine the relative direction $\theta_1$ at which RF or other signals are received from and transmitted to the newly joining node 504. This may be based on directional antennas or any other analog or digital direction determination principle(s). As a particular example, each local sensor master 302a-302b could transmit omni-directional beacons containing necessary information for requesting access to a wireless network. If the newly joining node 504 receives the beacon from the local sensor master 302a, the newly joining node 504 can send an association request to the local sensor master 302a. The local sensor master 302a can determine the relative direction $\theta_1$ of the newly joining node 504, such as by using its directional capabilities, during reception of the association request.

To obtain more information about the newly joining node's location, the local sensor master 302a can transmit a series of messages (called "r-poll" frames), such as at random intervals. Each "r-poll" frame can be sent at a different power level, and the "r-poll" frames can be sent in the direction of the newly joining node 504 using directional beams. The newly joining node 504 can reply to each of the "r-poll" frames it receives with an "r-poll response" frame, which can be transmitted within a small "r-poll-response-wait-time" time period.

If the newly joining node 504 responds outside of the "r-poll-response-wait-time" time period, the newly joining node 504 can be disqualified for association to the wireless network. Otherwise, depending on the responses received from the newly joining node 504, the local sensor master 302a can determine its approximate distance to the newly joining node 504, such as by using time-of-flight calculations or received signal strength (RSS) detection. Given the relative direction $\theta_1$ and distance from the newly joining node 504, the local sensor master 302a could make an initial determination whether the newly joining node 504 is within the specified area 502. However, if the local sensor master 302a receives inconsistent "r-poll response" frames from the newly joining node 504, the newly joining node 504 can be disqualified for association to the wireless network.

If the local sensor master 302a cannot determine the newly joining node's location from the obtained information, the local sensor master 302a may request that another local sensor master 302b determine the direction of the newly joining node 504. The local sensor master 302a, after initially estimating the newly joining node's location, could also request that another local sensor master 302b confirm the newly joining node's location. In either case, the local sensor master 302a can communicate with the local sensor master 302b as shown in FIG. 5, such as by requesting that the neighboring local sensor master 302b determine the relative direction $\theta_2$ of the newly joining node 504. The local sensor master 302b can transmit a "θ-confirm" frame, and the newly joining node 504 can respond with a "θ-confirm response" frame. The local sensor master 302b determines the relative direction $\theta_2$ of the newly joining node 504 based on the response and provides the relative direction $\theta_2$ back to the first local sensor master 302a. Since the communication between the local sensor masters 302a-302b is secure and directional, the newly joining node 504 cannot intercept and use the communication to enter the wireless network illicitly. Note that the local sensor masters 302a-302b can communicate with each other wirelessly in a direct or multi-hop manner (such as by using directional beams) or over the backbone network 402.

Using the direction(s) of and distance(s) to the newly joining node 504, the local sensor master 302a can determine if the newly joining node 504 lies within the specified area 502. For example, the local sensor master 302a can access and use information from a network database to determine if the newly joining node 504 lies within the specified area 502. The network database can store data defining the boundaries of the specified area 502 such as digitized maps or floor plans, and the local sensor masters 302a-302b may know the locations of each other (possibly from data retrieved from the network database). Using this information, the local sensor master 302a can make a determination with a relatively high level of certainty whether the newly joining node 504 lies within the specified area 502.

If the location of the newly joining node 504 can be determined and is acceptable, the local sensor master 302a can send an association response to the newly joining node 504. The association response can indicate the result of the location checking. The association response can indicate to the newly joining node 504 whether the newly joining node 504 is allowed to communicate over the wireless network.

In some embodiments, the local sensor masters 302a-302b may use directional beams to communicate with newly joining nodes, other local sensor masters, and other nodes. This may limit a communication to the destination node or to a smaller group of nodes. The local sensor masters 302a-302b can also use appropriate transmission power levels so that wireless messages do not travel far beyond the present location of the destination node(s), which can help to avoid eavesdropping from outside the specified area 502.

In this technique, the "r-poll" procedure can help in determining the distance of a newly joining node 504 and in avoiding combined cheating by two nodes placed outside the specified area 502 in appropriate directions with respect to the local sensor master 302a and neighboring nodes. Also, the "θ-confirm" procedure can help to confirm the location of the newly joining node 504 and to avoid cheating by using extraordinarily sensitive nodes placed outside the specified area 502. The flexibility of repeating the "θ-confirm" procedure in doubtful cases makes the scheme even more robust. In addition, this technique does not require any additional resources at a valid newly joining node, and it may not place any excessive communication overhead on the local sensor masters. This can free the nodes from security-related computational overheads.

Although FIGS. 3 through 5 illustrate example wireless clusters and related operations supporting location-based access control, various changes may be made to FIGS. 3 through 5. For example, this technique represents only one possible technique for location-based access control. Any other suitable technique could be used to determine a location of a wireless node attempting to join a wireless network. Also, while described here as being used with sensor nodes, the same or similar technique could be used with other types of wireless nodes in any other network.

Figure 6:
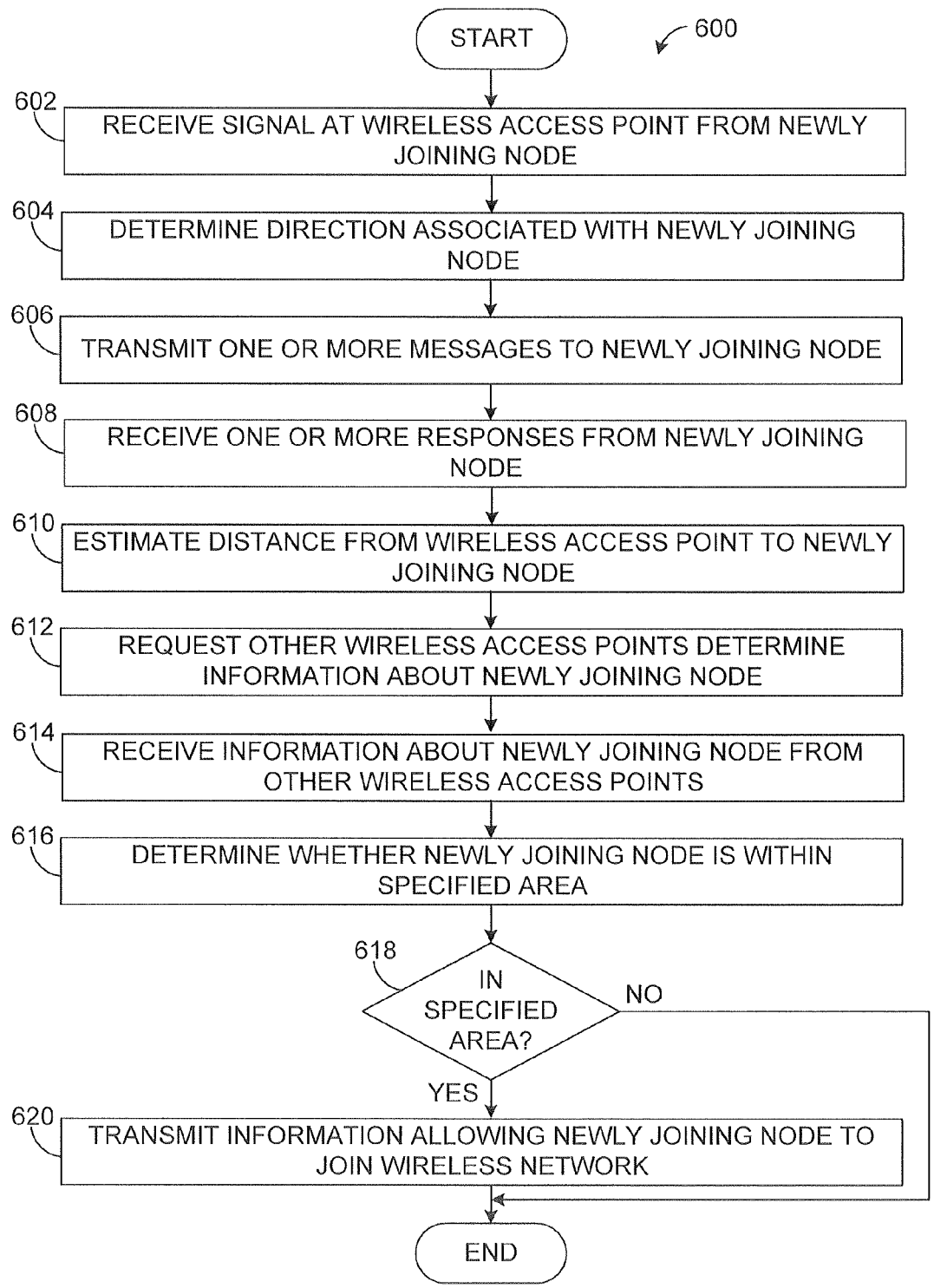
FIG. 6 illustrates an example method for location-based access control according to this disclosure.

FIG. 6 illustrates an example method 600 for location-based access control according to this disclosure. The embodiment of the method 600 shown in FIG. 6 is for illustration only. Other embodiments of the method 600 could be used without departing from the scope of this disclosure.

A wireless access point receives a wireless signal from a newly joining node at step 602. This could include, for example, an infrastructure node 108a-108e or 112 receiving a wireless signal from a new leaf node 110a-110e. This could also include a local sensor master 302a-302d receiving a wireless signal from a new sensor 304-316. The received wireless signal could represent an association request or other signal sent in response to the wireless access point's beacon.

The wireless access point determines a direction associated with the newly joining node at step 604. This could include, for example, the wireless access point using a direction-of-arrival technique or another technique to identify a direction from which the received wireless signal was transmitted.

One or more messages are transmitted to the newly joining node by the wireless access point at step 606, one or more responses from the newly joining node are received at step 608, and an estimated distance between the wireless access point and the newly joining node is determined at step 610. This could include, for example, the wireless access point transmitting "r-poll" or other messages using directional beams at different power levels in the identified direction. The different power levels could be selected to help ensure that the transmitted messages do not travel far beyond a specified area. This could also include the wireless access point using time-of-flight or other calculations to estimate the distance between the wireless access point and the newly joining node. Note that the wireless access point may not receive responses to all messages sent to the newly joining node, such as when a message is transmitted with too weak of a transmission power. However, the lack of a response in those circumstances can still be used to help estimate the distance to the newly joining node.

The wireless access point requests that one or more other wireless access points determine information about the newly joining node at step 612. This could include, for example, one infrastructure node 108a-108e or 112 requesting that another infrastructure node identify its relative direction to the newly joining node. This could also include one local sensor master 302a-302d requesting that another local sensor master identify its relative direction to the newly joining node. The selection of the other wireless access point(s) could be done in any suitable manner, such as by selecting another wireless access point that is relatively close to an estimated location of the newly joining node. The wireless access point then receives the information about the newly joining node from the other access point(s) at step 614. This could include, for example, the wireless access point receiving the information wirelessly or over a wired network (such as a wired backbone network).

The wireless access point determines whether the newly joining node is within a specified area at step 616. This could include, for example, the wireless access point accessing a database (either locally or remotely) to obtain information about the specified area and about the access points' locations. Using the estimated distance and relative directions associated with the newly joining node, the wireless access point can make a determination whether the newly joining node is within a specified geographic space.

If the newly joining node is within the specified area at step 618, the wireless access point transmits information allowing the newly joining node to join the wireless network at step 620. This could include, for example, the wireless access point transmitting an association response indicating that the newly joining node is allowed to communicate over the wireless network. The association response could contain any other information, such as a time slot or frequency to be used by the newly joining node to communicate over the wireless network. If the newly joining node is not within the specified area at step 618, any suitable action could be taken. For example, the wireless access point could refuse to communicate with the newly joining node and notify other wireless access points not to communicate with the newly joining node and/or notify the physical security department of the malicious device.

Although FIG. 6 illustrates one example of a method 600 for location-based access control, various changes may be made to FIG. 6. For example, while shown as a series of steps, various steps in FIG. 6 could overlap, occur in parallel, occur in a different order, or occur multiple times. Also, various steps in FIG. 6 could be combined, such as when the wireless access point uses the responses in step 608 to estimate both the relative direction and distance associated with the newly joining node. Further, various steps in FIG. 6 could be omitted, such as when the wireless access point estimates the distance to the newly joining node without estimating the relative direction or vice versa. In addition, the wireless access point could communicate with other access points only when the wireless access point is unable to estimate the location of the newly joining node.

Note that a wide variety of other functions in a system could be enabled or supported by the location-based access control techniques described above. For example, after the location of a newly joining node has been established, the location of the newly joining node can be sent to a central server. The central server could then plot the determined location on a floor or premises map and present the map to a user. Personnel could manually verify the location of the newly joining node to ensure that it is in a desired location. This could help to reduce or avoid manual errors in installing devices at wrong locations.

Moreover, after a newly joining node is associated with a network, it often needs to be configured. Configuration parameters could include an identification of the correct gateway or controller with which the newly joining node communicates, as well as an identification of the correct communication format, traffic pattern, and network parameters to be used. This configuration is often done using a handheld infrared device or a wired tool by authenticated personnel in physical proximity to the newly joining node in order to ensure secure configuration. The plotted location of the newly joining node on the map can be used to facilitate quicker access to the newly joining node.

Alternatively, since transmit power and beam forming can be used to control communications with the newly joining node, more secure communications can occur with the newly joining node. As a result, the newly joining node could be configured wirelessly without any physical visit to the newly joining node. The ability to wirelessly configure the newly joining node may eliminate the need to factory program controller-device pairing and network parameters, and the newly joining node need not include DIP switches or other means to field program the node. In addition, there could be multiple wireless networks in a given space, and the newly joining node may need to be programmed with information allowing it to join the correct network. Here, the newly joining node can be identified from its location and wirelessly configured with the information needed to join and operate over the correct network.

As another configuration example, sensor nodes may not have the ability to communicate in a directional manner, so their transmissions may be simple broadcasts into free space that can be received by any intruder. The sensor node may have the ability to execute security algorithms (such as encryption, decryption, or integrity checks), and these algorithms can be implemented for secure wireless transmission. In particular embodiments, these algorithms may require the use of a shared security key, which can be securely delivered to the sensor node as described above using the known location of the node.

Also note that sensor masters or other nodes may use multiple techniques to identify the location of a node. These techniques could include RSSI triangulation, direction of arrival, and time of flight. Multiple techniques can be used to increase the precision of a determined location of a device, and the location obtained using one technique could be confirmed using another technique.

In particular embodiments, the installation and commissioning of a newly joining node may occur as follows. First, one or more infrastructure nodes or sensor masters determine the location of the newly joining node and verify the location using other networked node(s). The location of the newly joining node is verified using a floor or premises map. Data is then provided to the newly joining node, such as a network address, a device address, time slots, security keys, identification of parent nodes, and other networking information. This data could be obtained from a device database or based on user input. At this point, the newly joining node can begin operation in the system.

As yet another example, end nodes (leaf nodes and non-master sensors) may have the ability to determine RSSI values for incoming transmissions. If the density or capability of infrastructure or master nodes is not adequate to precisely find the location of a newly joining node, an infrastructure or master node can request that some established end nodes find RSSI values for the newly joining node. Triangulation algorithms could then be used to identify or confirm the location of the newly joining node. Any other possible wireless or non-wireless techniques available at the end nodes can be used for this joint location detection.

Also note that the identification of a node's location may occur multiple times. For example, during normal operation, a node's location can be periodically verified to ensure the node's validity. This could be done for every packet reception/transmission involving the node or by sending low-periodicity security check messages to the node. Alternatively, communications with the node can be done using power-controlled directional beams so that the signals adequately reach a destination at a known location.

The failure of a node also has security implications. In some embodiments, the failed node's location is displayed on a floor or premises map at a central station, which can help in identifying and replacing the failed node in the field. Also, replacement of the failed node may be allowed after an operator acknowledges the failed node so that a fake node cannot be installed by replacing a valid node. In addition, the replacement node can be installed and commissioned using same procedure described above.

Further note that the authentication of a master or infrastructure node is often important since a compromised master or infrastructure node can compromise an entire set of end nodes. In some embodiments, the desired location of a master or infrastructure node can be indicated or programmed by a user on a central station. A new master or infrastructure node's location can be detected by established nodes using the techniques described above. The operator at the central station can then verify the detected location against the desired location to authenticate the new master or infrastructure node and allow the new node to join the network. The new node may then be asked to participate in the location detection process with other established nodes to increase location detection accuracy. In particular embodiments, a master or infrastructure node may have GPS or other advanced technology to find its location in outdoor locations, and established nodes can verify that location using other techniques.

Finally, the authentication of mobile devices, such as those used for remote monitoring and configuration, clearly has security implications. These mobile devices could have access to every node, central station, controller, and important database in a system, so authenticating mobile devices is often very critical. Mobile devices can be specifically identified and allowed access from multiple locations in a facility, while fixed devices may be allowed access only from a predefined location. The location of a mobile device can be determined at every information access or login, and it can be tracked continuously. A mobile device could be allowed access if it is within a premises' boundaries. As mentioned above, a local infrastructure or master node and, if needed nearby sensor nodes, can determine the mobile device's location using one or more location detection techniques. The precise location can be detected and correlated on a premises map to prevent an intruder from accessing the network from outside or at the fence of a premises.

There could also be some restricted areas within the premises where mobile devices are not allowed. This could be related to security, personnel safety, plant safety, or other reasons. One specific example is hazardous areas where only "intrinsically safe" devices are allowed. In this example, each fixed and mobile node can be identified as an intrinsically safe or unsafe device. This information can be stored in a system database, which can be accessed by the infrastructure or master nodes through which a mobile device accesses the network. If the location of a mobile device is within a restricted area, the infrastructure or master nodes can alert security personnel of the incident or alert an operator using the mobile device. The mobile device can convey the alert to the user through a user interface or other audio/visual means. The mobile device can also be designed to be remotely disabled or powered off from an infrastructure or master node or from the central station to avoid danger to the facility, and/or the physical security department can be notified of the mobile device operating in the restricted area.

This represents merely some ways in which location-based access control can be used. This technology could be used in any other or additional manner without departing from the scope of this disclosure.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving wireless signals from a device at a wireless access point associated with a wireless network;
   estimating a location of the device;
   determining whether the estimated location of the device is within a specified area; and
   allowing the device to communicate over the wireless network in response to determining that the estimated location of the device is within the specified area;
   wherein estimating the location of the device comprises:
   estimating a direction of the device with respect to the wireless access point using a direction of arrival of at least one wireless message received at the wireless access point from the device; and
   estimating a distance of the device from the wireless access point by transmitting multiple messages to the device at different power levels and receiving one or more responses from the device.

2. The method of claim 1, wherein the multiple messages are transmitted to the device at random times; and
   further comprising disqualifying the device from communicating over the wireless network when the device fails to transmit at least one of the responses to the wireless access point within a specified time period.

3. The method of claim 1, further comprising:
   requesting information about the device from a second wireless access point; and
   receiving the information about the device from the second wireless access point.

4. The method of claim 3, wherein the information about the device from the second wireless access point comprises an estimated direction of the device with respect to the second wireless access point.

5. The method of claim 1, further comprising:
   transmitting a beacon from the wireless access point;
   wherein the device transmits at least some of the wireless signals to the wireless access point in response to receiving the beacon.

6. The method of claim 1, further comprising:
   displaying the estimated location of the device on a map associated with the specified area; and
   receiving information verifying the device based on the displayed estimated location of the device from a user.

7. A method comprising:
   receiving wireless signals from a device at a wireless access point associated with a wireless network;
   estimating a location of the device;
   determining whether the estimated location of the device is within a specified area; and
   allowing the device to communicate over the wireless network in response to determining that the estimated location of the device is within the specified area;
   wherein allowing the device to communicate over the wireless network comprises:
   wirelessly transmitting configuration information to the device using directional beams; and
   configuring the device based on the configuration information.

8. A method comprising:
   receiving wireless signals from a device at a wireless access point associated with a wireless network, wherein the device comprises a mobile device;
   estimating a location of the device;
   determining whether the estimated location of the device is within a specified area;
   allowing the device to communicate over the wireless network in response to determining that the estimated location of the device is within the specified area;
   continuously estimating the location of the mobile device;
   determining whether the estimated location of the mobile device is in a restricted area within the specified area; and
   when the estimated location of the mobile device is in the restricted area, at least one of:
   disabling the mobile device, powering down the mobile device, and notifying security personnel.

9. An apparatus comprising:
   a wireless interface configured to receive wireless signals from a device attempting to communicate over a wireless network; and a controller configured to estimate a location of the device and to allow the device to join the wireless network based on a determination that the estimated location of the device is within a specified area;

wherein the controller is configured to estimate the location of the device by:

estimating a direction of the device with respect to the apparatus using a direction of arrival of at least one wireless message received at the apparatus from the device; and estimating a distance of the device from the apparatus by initiating transmission of multiple messages to the device at different power levels and analyzing one or more responses received from the device.

10. The apparatus of claim 9, wherein:
the controller is further configured to initiate transmission of a request for information about the device to a wireless access point; and
the wireless interface is configured to receive the information about the device from the wireless access point.

11. The apparatus of claim 10, wherein the information about the device from the wireless access point comprises an estimated direction of the device with respect to the wireless access point.

12. The apparatus of claim 10, wherein the controller is configured to initiate transmission of multiple requests for information about the device to multiple wireless access points at multiple times.

13. The apparatus of claim 9, wherein:
the controller is further configured to initiate transmission of a request for information about the device to one or more established end points;
the wireless interface is configured to receive the information about the device from the one or more established end points, the information determined by the one or more established end points; and
the controller is configured to estimate the location of the device using the information about the device from the one or more established end points.

14. The apparatus of claim 9, wherein:
the apparatus is configured to transmit the multiple messages to the device at random times; and
the controller is further configured to disqualify the device from communicating over the wireless network when the device fails to transmit at least one of the responses to the apparatus within a specified time period.

15. The apparatus of claim 9, wherein the controller is configured to allow the device to communicate over the wireless network by initiating wireless transmission of configuration information to the device using directional beams.

16. The apparatus of claim 9, wherein:
the device comprises a mobile device; and
the controller is further configured to:
continuously estimate the location of the mobile device;
determine whether the estimated location of the mobile device is in a restricted area within the specified area; and
when the estimated location of the mobile device is in the restricted area, at least one of: disable the mobile device, power down the mobile device, and notify security personnel.

17. An apparatus comprising:
a wireless interface configured to receive wireless signals from a device attempting to communicate over a wireless network; and
a controller configured to estimate a location of the device and to allow the device to join the wireless network based on a determination that the estimated location of the device is within a specified area;
wherein the controller is further configured to repeatedly estimate the location of the device, the device comprising an original device, and to allow a replacement device to access the wireless network in place of the original device only in response to user input indicating that the original device has failed.

18. A non-transitory computer readable medium embodying a computer program, the computer program comprising computer readable program code for:
estimating, at a wireless access point associated with a wireless network, a location of a device attempting to access the wireless network;
determining whether the estimated location of the device is within a specified area; and
allowing the device to communicate over the wireless network in response to determining that the estimated location of the device is within the specified area;
wherein the computer readable program code for estimating the location of the device comprises computer readable program code for:
estimating a direction of the device with respect to the wireless access point using a direction of arrival of at least one wireless message from the device; and
estimating a distance of the device from the wireless access point by initiating transmission of multiple messages to the device at different power levels and analyzing one or more responses received from the device.

19. The computer readable medium of claim 18, wherein:
the computer readable program code for estimating the distance of the device from the wireless access point comprises computer readable program code for initiating transmission of multiple messages to the device at random times; and
the computer program further comprises computer readable program code for disqualifying the device from communicating over the wireless network when the device fails to transmit at least one of the responses to the wireless access point within a specified time period.

20. The computer readable medium of claim 18, wherein:
the device comprises a mobile device; and
the computer program further comprises computer readable program code for:
continuously estimating the location of the mobile device;
determining whether the estimated location of the mobile device is in a restricted area within the specified area; and
when the estimated location of the mobile device is in the restricted area, at least one of: disabling the mobile device, powering down the mobile device, and notifying security personnel.

* * * * *